Jan. 24, 1928.  
I. J. WEBSTER  
1,657,052

METHOD OF MAKING INNER TUBES FOR PNEUMATIC TIRES

Filed Sept. 29, 1923

Inventor:
Ira J. Webster,
by Jesse A. Holton
his Atty.

Patented Jan. 24, 1928.

1,657,052

UNITED STATES PATENT OFFICE.

IRA J. WEBSTER, OF HAVERHILL, MASSACHUSETTS.

METHOD OF MAKING INNER TUBES FOR PNEUMATIC TIRES.

Application filed September 29, 1923. Serial No. 665,710.

This invention relates to inner tubes for pneumatic tires and the art of making same, having reference particularly to a method of manufacturing inner tubes possessing certain characteristic features relating to the inner periphery thereof.

In manufacturing inner tubes, it has generally been the custom, when a straight mandrel is employed on which to form the tubes, to remove the completed tube from the mandrel, loop the tube, and after joining its ends to form it into a continuous annular tube. It is evident, therefore, in tubes thus constructed that the portion of wall forming the inner periphery of a tube will be turned from a normally straight plane to a circular plane and that by so doing that portion of the wall of the tube will be cramped and its normal length being thereby shortened wrinkles and puckers will necessarily be formed therein in conforming to a circular plane. On the other hand that portion of the wall forming the outer periphery in being likewise turned from a normally straight plane to a circular plane will necessarily be stretched in order to provide increased length to that portion of the tube wall when formed into an annular tube. A tube thus made when in position in a shoe will have its inner periphery cramped and wrinkled, while its outer periphery will be unduly stretched, thereby causing the wall of the tube to be subjected to detrimental, opposed stresses.

Consequently, it has been found in tubes thus constructed that the inner periphery of a tube when held in position in a shoe or outer casing has formed therein at various points wrinkles or puckers, where the wall of the tube bends and cramps to conform to the circumferential contour of the inner periphery of the shoe. These wrinkles and puckers cause chafing of the tube as the shoe revolves and in consequence the tube has a tendency to wear through at certain points, thereby causing leaks and blowouts. My improved inner tube is designed to obviate these difficulties and to present a tube having distinctive, inherent advantages, and further a tube that is readily adjustable with relation to its shoe, together with a simple and practical method of manufacturing the same.

It is, therefore, one of the objects of the invention to provide a method of manufacturing annular inner tubes by employing a straight mandrel on which to form the tubes and so constructing the tubes on the straight mandrel that their proper inner and outer peripheries in their completed annular form will be preformed.

Another object is to provide a method of manufacturing annular inner tubes by utilizing a straight mandrel on which to form the tubes and so constructing the tubes on the straight mandrel that the inner periphery of the completed annular inner tubes will be free from wrinkles and puckers and their outer periphery will be unstretched and free from undue stress.

Another object is to provide an inner tube having a constriction strip of rubber associated with the inner tube at its inner periphery, whereby means is provided for removing the tendency of that portion of the tube to wrinkle or pucker when inserted in a shoe, thereby preventing leaks and blowouts.

Another object is to provide means on the inner periphery of an inner tube for reinforcing that portion of the tube which is in contact with the inner periphery of the shoe, thereby increasing the durability of the tube at that particular point and by thus increasing the thickness of the wall of the tube the maintenance of a smooth surface opposed to the smooth inner surface of the shoe will be insured.

Another object is to provide cushioning means on the inner periphery of the inner tube, whereby the resiliency of the inner tube and shoe is increased.

Still another object is to provide an efficient and economical method of producing inner tubes, wherein the inner periphery thereof will be held constantly under constriction, when in operative position in the shoe or outer casing.

The invention accordingly consists in the several method steps and their relation to each other, and their sequence, which will be exemplified in the method hereinafter disclosed, while the various features of construction, combination of elements and arrangement of parts will be likewise exemplified by the construction hereinafter set forth, the scope of the application of which and the steps of the method will be indicated by the claims following.

In the accompanying drawings, wherein is shown a preferred embodiment of the invention, especially as illustrative of the steps in the method of producing inner tubes in accordance with the invention:

Figure 1:
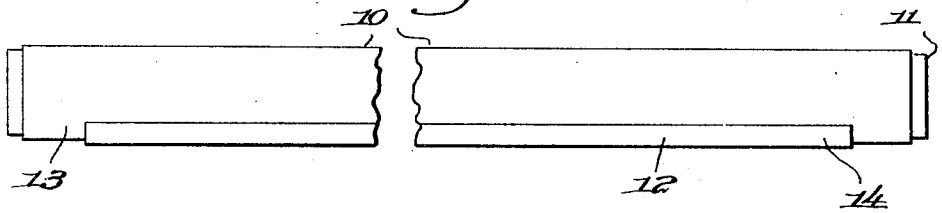
Figure 1 is a view illustrating the first step of the method.
Figure 2:
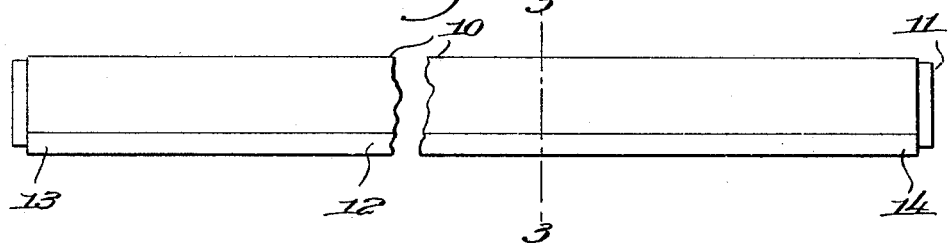
Figure 2 is a view illustrating the second step of the method.
Figure 3:
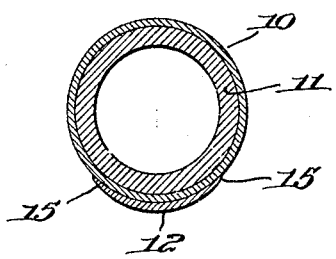
Figure 3 is a cross section, on the line 3—3 of Figure 2, as shown therein of a tube mounted on a mandrel with the constriction strip attached.
Figure 4:
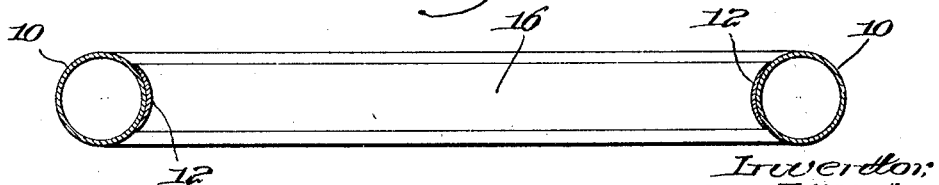
Figure 4 is a cross section of a completed annular inner tube embodying the invention, showing the constriction strip on the inner periphery of the inner tube.

In constructing an inner tube in accordance with the present invention a straight tube of rubber indicated at 10 is formed on a straight mandrel 11, the ends of the mandrel 11 being preferably mounted on suitable supports. Upon the outer surface of the tube 10 is then applied a longitudinal strip of rubber 12 of less length than the length of the tube 10 as clearly shown in Figure 1, and constituting a constriction strip. The rubber strip 12 having previously been coated on one side with rubber cement or other suitable adhesive is then stretched so that its ends 13 and 14 will coincide and be co-equal with the ends of the tube 10 in its normal position as shown in Figure 2, after which the rubber strip 12 and tube 10 as thus associated, are cemented or otherwise secured together. The side edges 15 of the rubber strip 12 are chamfered, as shown in Figures 3 and 4 in order to form reduced edges for securely attaching the rubber strip 12 to the tube 10, as well as giving a rounded contour to the rubber strip 12, so as to provide ready and unimpeded co-operation between the opposed surfaces of the rubber strip 12 and the shoe or outer casing.

After the stretched rubber strip 12 has been cemented or otherwise attached to the tube 10 as by acid vulcanization, whereby the rubber strip 12 and tube 10 are united into a homogeneous union, the tube thus formed is removed from the mandrel 11 and the next step consists in looping the tube 10 and bringing its ends together in such a way as to form a continuous, annular inner tube and thus bring the constriction rubber strip 12 on the inner periphery 16 of the annular inner tube. After this the ends of the tube are vulcanized or otherwise permanently united together and the inner tube is completed. A suitable air tube and valve are attached to the annular inner tube, but are not shown, since they form no essential part of the present invention. It is to be noted that the constricting or stretching method employed involves the use of two extensible parts joined together in cooperation, thereby producing uniformity of resiliency throughout.

When a tube 10 thus constructed is inserted in a shoe or outer casing and inflated the constriction strip 12 will draw that portion of the tube 10 forming its inner periphery 16 tightly over the inner surface of the shoe removing any wrinkles or puckers and thereby causing the inner periphery of the tube 10 to present a smooth outer surface in contact with the smooth inner surface of the shoe. Therefore, it is evident that the inner periphery 16 of the tube 10 will be held constantly under constriction in its shoe or outer casing. The inner periphery of the tube 10 being thus free from wrinkles and puckers presents no portions to rub and chafe together and break through, resulting in leaks and blowouts. Further, the reinforcement of the constriction strip 10 on the inner periphery 16 increases the durability of the tube, provides a resilient cushion at that point, thus increasing the resiliency of the whole assembled tire structure, while by the added thickness of the constriction strip 12 a smooth outer surface on the inner periphery 16 is produced.

Moreover, it is to be noted that the constriction strip 12 compressed the mass of rubber in the inner periphery 16, radiating its compression effect toward the median line of the tube with gradually diminishing force until at that point the compression effect is practically negligible, and leaving that portion of the tube extending from the median line to the outer periphery free from any stress and in condition to readily extend into and comprise the proper unstretched outer periphery of the tube in its completed annular form as previously pointed out.

For some purposes it may be desirable to turn the tube inside out after it is removed from the mandrel, thus bringing the constricting strip within the air chamber and not exposed to view. Therefore, this additional step is to be considered as within the range of the present invention.

It is, therefore, evident that inner tubes made according to this method have certain dominant characteristics that render them durable and efficient in use, superior in these characteristics to inner tubes in general use, while in addition they possess the important and distinctive advantage of eliminating leaks and blowouts in the inner periphery of inner tubes.

Furthermore, it is to be understood that the method and construction herein disclosed are for the purpose of affording a clear understanding of the invention only and that the invention is not to be limited to the specific details shown, but that changes therein and modifications thereof may be resorted to within the scope of the claims and without departing from the invention or sacrificing any of the advantages thereof.

I claim:—

1. The method of manufacturing inner tubes for pneumatic tires, which consists in forming a rubber tube on a mandrel, applying to the said rubber tube a longitudinal strip of rubber of less length than the length of the rubber tube, stretching the said longitudinal rubber strip, securing the stretched longitudinal rubber strip to the rubber tube in its normal position, removing the said rubber tube from the mandrel, and then looping the rubber tube and permanently joining its end so as to form a continuous, annular inner tube, whereby the longitudinal rubber strip will be positioned on the inner periphery of the said annular inner tube.

2. The method of manufacturing inner tubes for pneumatic tires, which consists in forming a rubber tube on a mandrel, applying to the said rubber tube a longitudinal strip of rubber of less length than the length of the rubber tube, stretching the said longitudinal rubber strip so as to make the longitudinal rubber strip co-equal in length with the said rubber tube in its normal position, vulcanizing the said longitudinal rubber strip to the rubber tube in its normal position, removing the said rubber tube from the mandrel, and then looping the rubber tube and permanently joining its ends so as to form a continuous, annular inner tube, whereby the longitudinal rubber strip will be positioned on the inner periphery of the said annular inner tube.

IRA J. WEBSTER.